US008007110B2

(12) United States Patent
Dunn et al.

(10) Patent No.: US 8,007,110 B2
(45) Date of Patent: Aug. 30, 2011

(54) PROJECTOR SYSTEM EMPLOYING DEPTH PERCEPTION TO DETECT SPEAKER POSITION AND GESTURES

(75) Inventors: Joseph Wesslund Dunn, Arlington Heights, IL (US); Gregory Joseph Dunn, Arlington Heights, IL (US); Boaz Super, Westchester, IL (US); Tianli Yu, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 766 days.

(21) Appl. No.: 11/966,463

(22) Filed: Dec. 28, 2007

(65) Prior Publication Data

US 2009/0168027 A1 Jul. 2, 2009

(51) Int. Cl.
*G03B 21/26* (2006.01)
(52) U.S. Cl. ............................................. 353/28; 353/97
(58) Field of Classification Search ............... 353/28, 353/30, 97
See application file for complete search history.

(56) References Cited

U.S. PATENT DOCUMENTS

| | | | |
|---|---|---|---|
| 6,556,704 B1 | 4/2003 | Chen | |
| 6,775,014 B2 * | 8/2004 | Foote et al. | 356/621 |
| 7,227,526 B2 * | 6/2007 | Hildreth et al. | 345/156 |
| 7,768,527 B2 * | 8/2010 | Zhang et al. | 345/619 |
| 7,809,183 B2 | 10/2010 | Criminisi et al. | |
| 2003/0156756 A1 | 8/2003 | Gokturk et al. | |
| 2007/0273842 A1 * | 11/2007 | Morrison et al. | 353/97 |

OTHER PUBLICATIONS

Tat-Jen Cham, et al., Shadow Elimination and Occluder Light Suppression for Multi-Projector Displays', Cambridge Research Laboratory, Mar. 2002.

* cited by examiner

*Primary Examiner* — Tony Ko (57) ABSTRACT

A projection system that prevents projection light on a presenter and provides a gesture based interface for visual enhancements is disclosed. The system may include a projector camera system comprising a computer communicating an image to a projector, the projector projecting the image on a screen, a stereo camera unit mounted approximately in the plane of the screen or at the projector and directed toward the presenter and communicating with the computer, and software that interprets the stereo camera data to distinguish and manipulate foreground and background features. The foreground feature may be the presenter relative to the screen or to the audience and room, or the presenter's hand relative to the presenter. The invention employs imaging stereo camera algorithms and techniques developed for foreground/background segmentation, image manipulation, and gesture recognition.

18 Claims, 10 Drawing Sheets

PROJECTOR SYSTEM EMPLOYING DEPTH PERCEPTION TO DETECT SPEAKER POSITION AND GESTURES

BACKGROUND OF THE INVENTION

1. Field of the Invention

The present invention relates to a projection presentation system, and more particularly, to a projection presentation system which allows a presenter to perform a presentation with minimized projection on the speaker when he is in front of the screen.

2. Introduction

In a presentation where a presenter shows an audience presentation materials by displaying the materials on a monitor screen or projecting screen, the presenter explains the material by gesturing at the presentation materials being displayed using his hands or a pointer bar or laser pointer or the like. Whether using a rear-projection system or a front projector system, the presenter interacts with a computer by directly operating the computer in order to display or operate an object like a video or file contained in the presentation materials. Generally, presentations are problematic in that there is a restriction on the interaction the presenter can perform and the procedure or interaction is not natural as compared to a presentation without a computer. An additional problem with front projection systems is that part of the projection can land on the presenter, causing discomfort and disorientation. Being in the projection beam, the presenter is blinded by the projector and cannot see the audience. From the observer's point of view, text and graphics projected onto the speaker are quite distracting to an audience. Rear-projection systems, while not suffering the projection on the presenter problem, are expensive and require specialized projection surfaces and space behind the screen for projectors.

For the reasons stated above, and for other reasons stated below which would become apparent to those skilled in the art upon reading and understanding the present specification, there is a need in the art for controlling the projecting beam impinging on the presenter. Further, there is a need in the art for a presentation system by which a presenter can interact with the presentation material in real time using gesture commands and manipulate the entire presentation from a natural position standing near a screen.

SUMMARY OF THE INVENTION

A projection system that prevents projection light on a presenter and provides a gesture based interface for visual enhancements is disclosed. The system may include a projector camera system comprising a computer communicating an image to a projector, the projector projecting the image on a screen, a stereo camera unit mounted approximately in the plane of the screen or at the projector and directed toward the presenter and communicating with the computer, and software that interprets the stereo camera data to distinguish and manipulate foreground and background features. The foreground feature may be the presenter relative to the screen or to the audience and room, or the presenter's hand relative to the presenter. The invention employs imaging stereo camera algorithms and techniques known in the art for foreground/background segmentation, image manipulation, and gesture recognition.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

The term "gesture" as used herein includes positions or shapes made using one or more hands or other body parts or other devices and also motions or motion patterns made using one or more hands, static symbols, or other body parts or other devices. These gestures may be correlated to various actions, as described in more detail below.

The term "projection screen", "viewing surface", or "screen" as used herein includes white, beaded, metallic, or metallic coated lenticular surfaces, or any surface suitable for viewing a projected image.

This invention concerns a projection system that eliminates projections on a speaker. As a corollary benefit this invention can also provide a gesture based interface for controlling a projected image.

Figure 1:
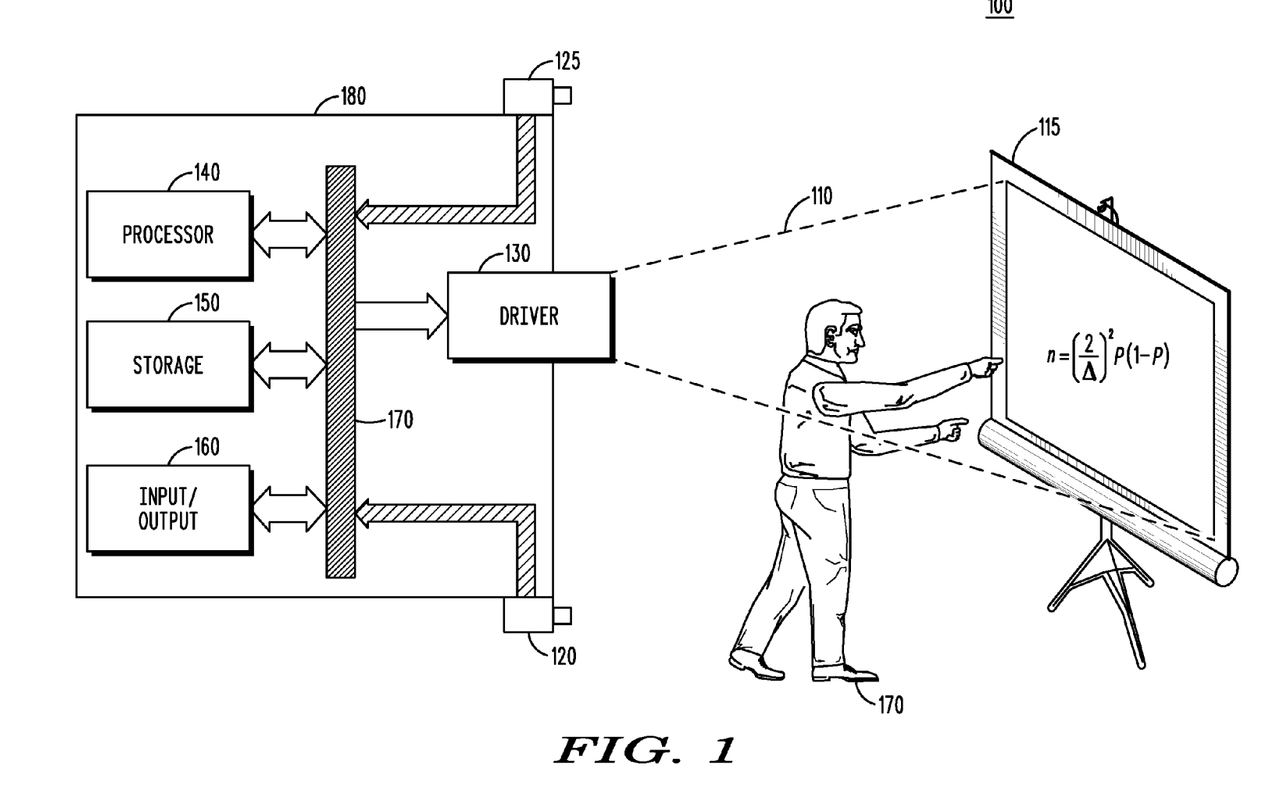
FIG. 1 illustrates an exemplary diagram of a projector system employing stereo cameras for detecting a speaker's position and gestures in accordance with a possible embodiment of the invention.

FIG. 1 illustrates an exemplary diagram of a projection system 100 in accordance with a possible embodiment of the invention. In particular, the projection system includes a first camera 120, a second camera 125, and a projection device 180 that includes a processor 140, a storage device 150, an input/output device 160, a data bus 170, a driver 130, and a projected image 110. Data bus 170 may permit communication among the components of the projection device 180 and cameras (120,125). Processor 140 may include at least one conventional processor or microprocessor that interprets and executes instructions. Memory or storage 150 may be a read only memory (ROM, a random access memory (RAM, or another type of dynamic storage device that stores information and instructions for execution by processor 140. Storage 150 may also store temporary variables or other intermediate information used during execution of instructions by processor 140. ROM may include a conventional ROM device or another type of static storage device that stores static information and instructions for processor 140. Storage device 150 may include any type of media, such as, for example, magnetic or optical recording media and its corresponding drive.

Input/output device 160 may include one or more conventional mechanisms that permit a user to input information to projection device 180, such as a keyboard, a mouse, a pen, a voice recognition device, etcetera. An output device may include one or more conventional mechanisms that output information to the user, including a display, a printer, one or more speakers, or a medium, such as a memory or a magnetic or optical disk and a corresponding disk drive. An input/output device 160 may also be a communication interface that includes any transceiver-like mechanism that enables the projection system 100 to communicate via a network such as a modem or an Ethernet interface for communicating via a local area network (LAN).

First camera 120 and second camera 125 are for capturing a left and right image for developing a stereoscopic view of the scene. If the fields of view of each camera overlap at least in part, one or more objects of the scene can be seen in both images. The first camera 120 and second camera 125 are a stereo camera or system comprising two or more monocular cameras for tracking the motion of the presenter 170. The presenter 170 is able to remotely interact with the projection device 180 by gesturing commands with part of his body.

When the first camera 120 and the second camera 125 are oriented towards the viewing surface or presentation screen 115 as shown, the speaker or presenter 170 is in the foreground relative to the screen 115. The stereo camera system consisting of first camera 120 and second camera 125 captures images of a foreground object (image of presenter 170) and a background object (image of presentation screen 115) and outputs these images to processor 140 so as to perform a depth imaging analysis. The depth imaging analysis separates the foreground image from the background image and determines the position of one or more foreground objects such as presenter 170, or the presenter's hand or arm, and uses this determination to modify a projected at least one image based on the position of the foreground object. A suitable modification in the projection environment is limiting the projected image to only the viewing surface, or limiting the projection on the presenter by reducing the intensity of the projected light or by shining a non-image light that illuminates the presenter at a brightness level that is comfortable for both the presenter and the audience. In another embodiment, a suitable modification in the projection environment is limiting the projected image to only the foreground object. This embodiment enables novel presentation schemes, such as the projection of text and graphics on the presenter's shirt or body, or on one or more static or mobile foreground objects, including objects held by the presenter. The projection may also be modified so different image contents are projected on the viewing surface and on the presenter's shirt or body or on one or more static or mobile foreground objects, including objects held by the presenter. The depth imaging analysis is also able to segment the scene into more than two foreground/background segments, for example to isolate a foreground object from background and further to isolate one or more parts of the foreground object from the foreground object. In the preferred embodiment, the isolated part of the foreground object is a gesturing hand that can be used to invoke enhanced presentation features such as highlighting text, highlighting objects, invoking a magnifying glass visual effect, selecting a slide from a slide show, controlling the projection device, and other visual enhancements or presentation aids.

It will be understood by those of ordinary skill in the art that the internal parameters of the cameras and projector and the external geometric relationships of the cameras, the projector, or the objects in the scene relative to each other can optionally be used to improve the quality, accuracy, or both of the modification of the projection.

It will also be understood by those of ordinary skill in the art that the embodiments described in this disclosure can also be enabled by visual or non-visual means of acquiring a depth image other than a stereo camera or two monocular cameras. Examples of alternative means of acquiring depth images include, but are not limited to, laser, sonar, and infrared range finders, and the use of projected structured light patterns. The exemplary embodiments will be described in terms of stereo cameras or two monocular cameras only, in order to avoid obscuring the pedagogical value of the description of the embodiments.

Projector driver 130 may change the projected image 110 in response to information received from processor 140. For example, processor 140 may cause projector driver 130 to modify the image in response to the current position, motion, and orientation of projector device 180. Most importantly, processor 140 may cause projector driver 130 to modify the projected image 110 based on the position of the presenter 170 and on the commands initiated by presenter 170. Projector driver 130 may be any type of suitable projector. In some embodiments, projector driver 130 is a small, light, battery-operated projector.

Figure 2:
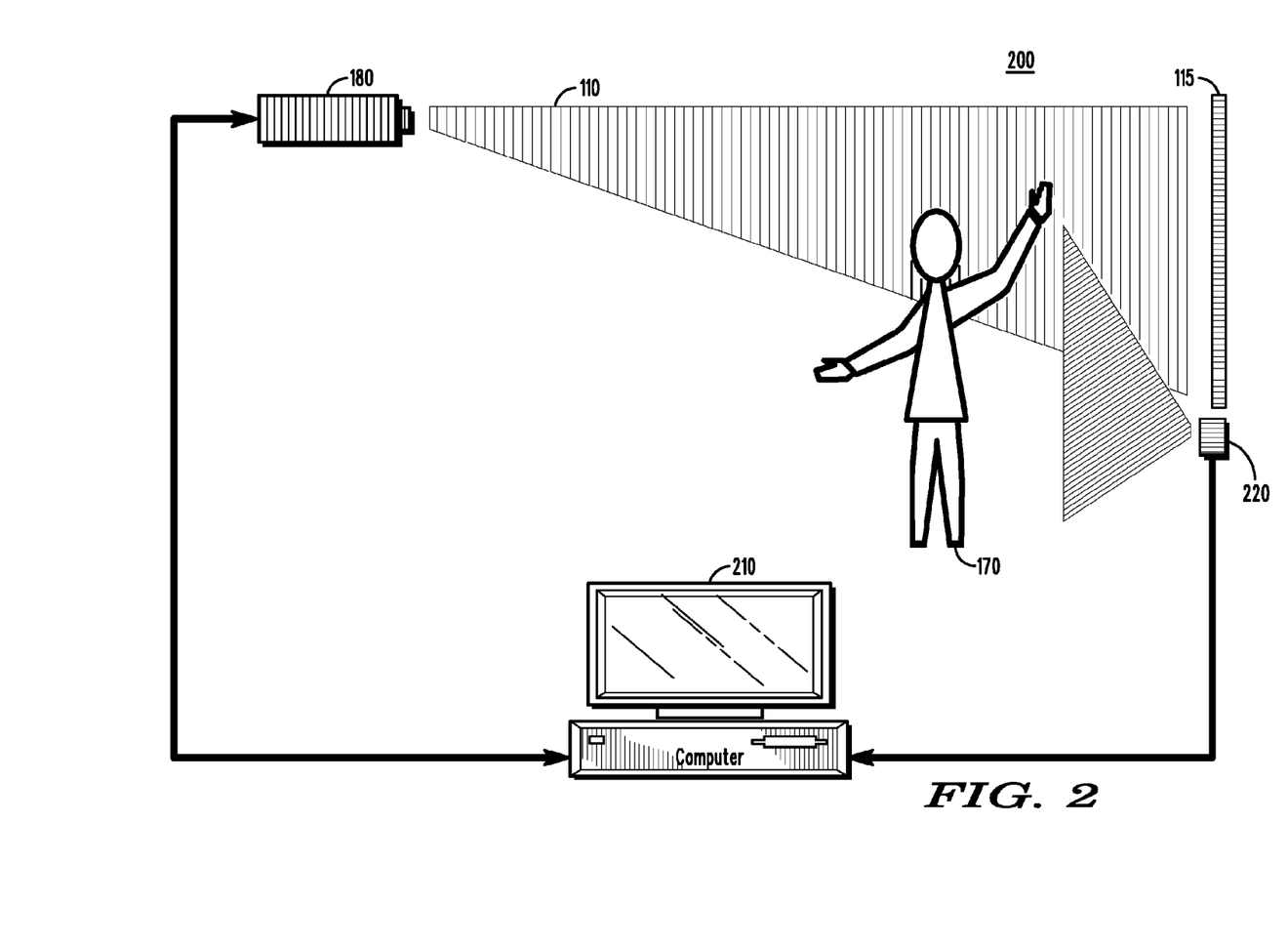
FIG. 2 illustrates an exemplary diagram of a projector system employing stereo cameras mounted at the viewing surface for detecting a speaker's position and gestures in accordance with a possible embodiment of the invention.

FIG. 2 is an illustration of an alternative projection system 200 in accordance with a possible embodiment of the invention. In particular, projection system 200 comprises a projection device 180, an optional workstation 210, a screen 115, a stereo camera 220 or system comprising two or more monocular cameras positioned at presentation screen 115. The stereo camera 220 captures images of a foreground object (image of presenter 170) and a background object (image of presentation device 180 or the audience or elements of the presentation room) and outputs them to processor 140 so as to perform a depth imaging analysis. In this arrangement, the processing could be performed by computer 210. The depth imaging analysis separates the foreground image from the background image and determines the position of a foreground object such as the presenter 170 to modify a projected at least one image based on the position of the foreground object. A suitable modification in the projection environment is limiting the projected image to only the viewing surface, or limiting the projection on the presenter by reducing the intensity of the projected light or by shining a non-image light that illuminates the presenter at a brightness level that is comfortable for both the presenter and the audience. In another embodiment, a suitable modification in the projection environment is limiting the projected image to only the foreground object. The projection may also be modified so different image contents are projected on the viewing surface and on the presenter's shirt or body or on one or more static or mobile foreground objects, including objects held by the presenter. The depth imaging analysis is also able to segment the scene into more than two foreground/background segments, for example to isolate a foreground object from background and further to isolate one or more parts of the foreground object from the foreground object. In the preferred embodiment, the isolated part of the foreground object is a gesturing hand that can be used to invoke enhanced presentation features such as highlighting text, highlighting objects, invoking a magnifying glass visual effect, selecting a slide from a slide show, controlling the projection device, and other visual enhancements or presentation aids.

Figure 3:
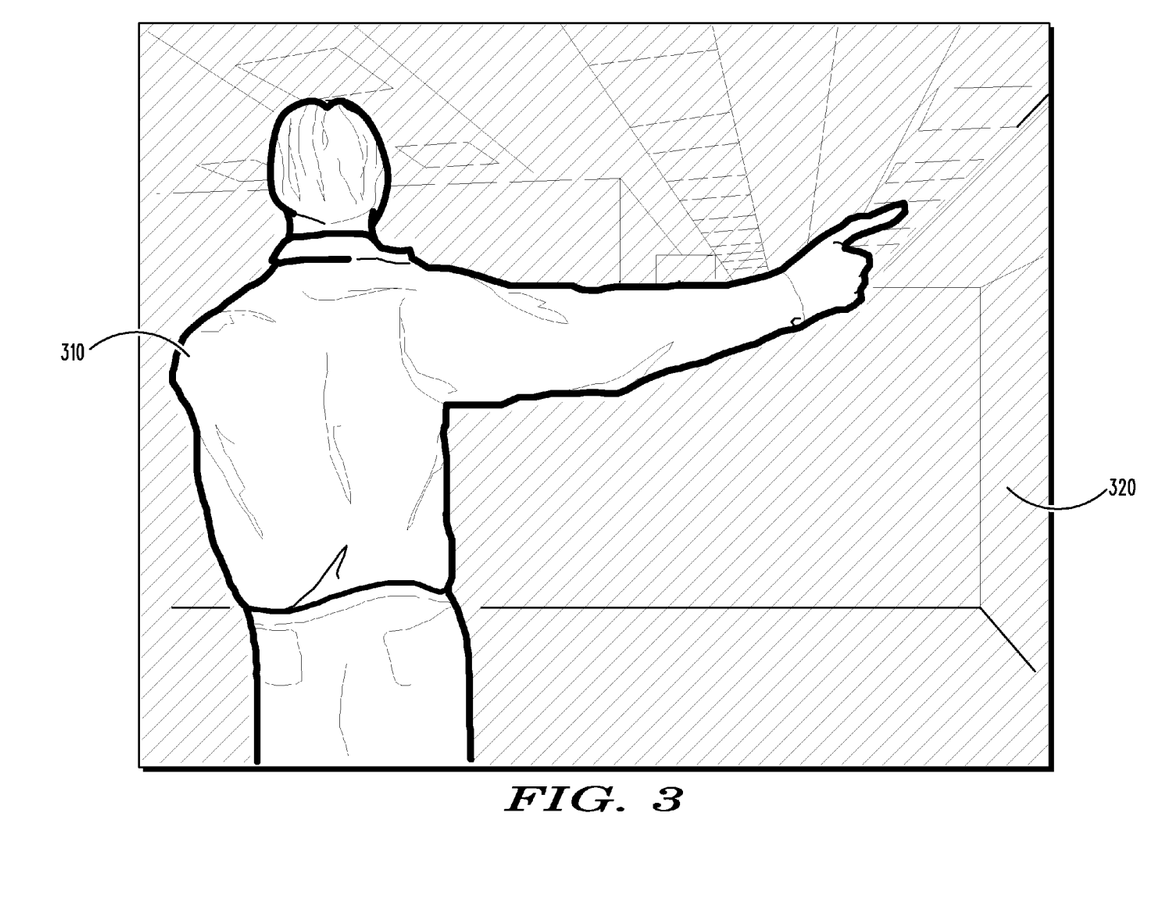
FIG. 3 illustrates an image of an object/speaker isolated from the background in accordance with a possible embodiment of the invention.

FIG. 3 is an illustration of an isolated foreground object in accordance with an embodiment. The isolation is accomplished through a depth imaging process using inexpensive stereo image sensors. The stereo depth imaging analysis produces a depth image whose pixel values represent the distance of the object to the camera 220, or first camera 120 and second camera 125 at that pixel. A stereo depth image can provide the scene's 3-D shape information regardless of texture variations such as clothing and shadow variations. Here the presenter 170 or foreground speaker 310 is isolated from the background 320.

Figure 4:
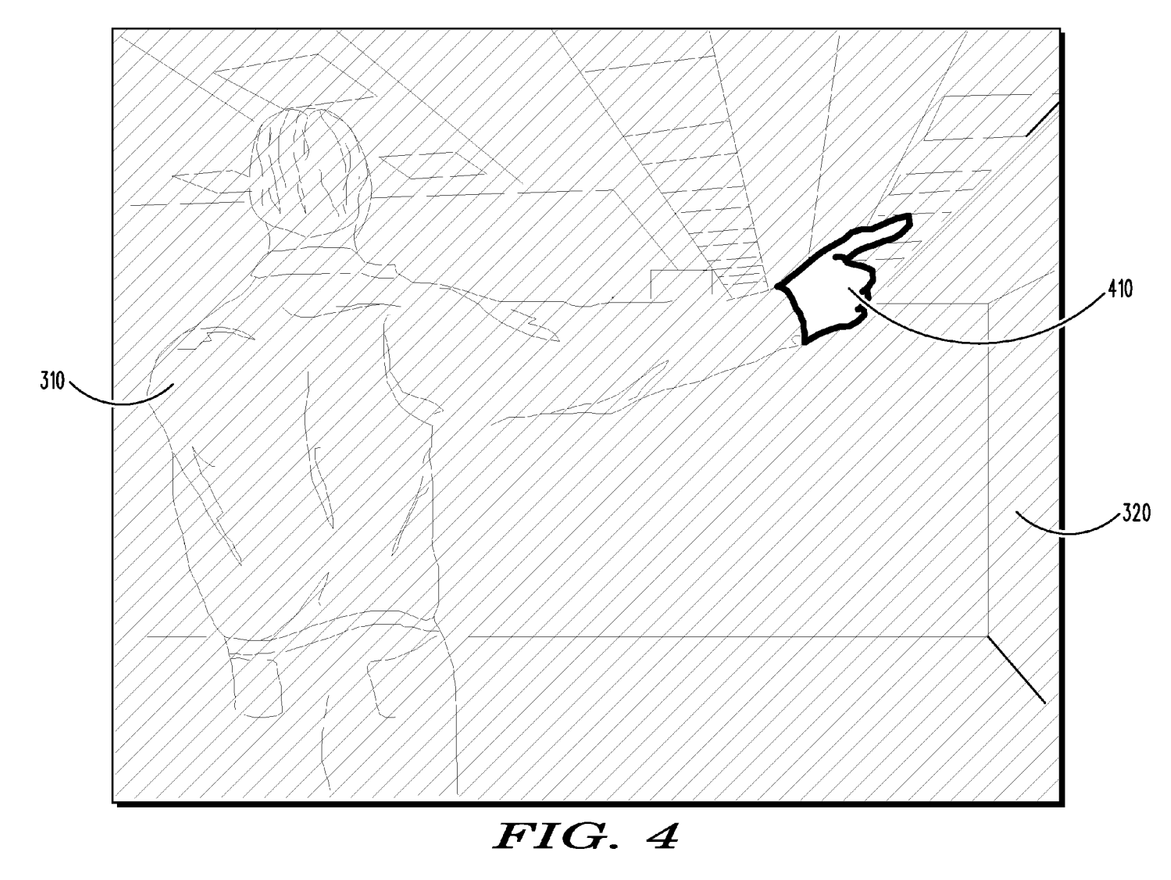
FIG. 4 illustrates an image of a speaker's gesture isolated from the background in accordance with a possible embodiment of the invention.

FIG. 4 is an illustration of an isolated gesture in accordance with an embodiment of the invention. Here the presenter's gesture 410 is isolated to produce an image of the gesture. The gesture can then be used to command, control, or invoke an enhanced feature of the projection system. The gesture can be one of a variety of hand gestures of a user that are recognized by software running in processor 140. From the gesture, processor 140 generates a command to perform an action such as highlighting text, highlighting objects, invoking a magnifying glass visual effect, selecting a slide from a slide show, controlling the projection device, or other visual enhancements or presentation aids.

For example, an outstretched hand tracking in a certain direction could indicate moving a window in that direction, a finger pointing in a particular direction could indicate invoking a magnifying glass, while moving towards or away from the screen could indicate more or less magnification, respectively. Further, pointing at a text or graphic object could highlight that object. The processor 140 may be configured to recognize various tracking patterns, such as various hand-related gestures such as a hand or finger moving from right to left, bottom to top, in and out, etcetera. Alternatively, processor 140 could be trained with an image recognition program to correlate various images or motion patterns to various control actions. In a possible implementation, image gestures received through first camera 120 and second camera 125 or stereo camera 220 are compared to at least one of a set of gestures stored in a suitable storage device, or correspond to a pre-defined motion pattern recognized by an image recognition program in processor 140. The processor may then forward information identifying the gesture to other devices or applications to invoke an action.

Figure 5:
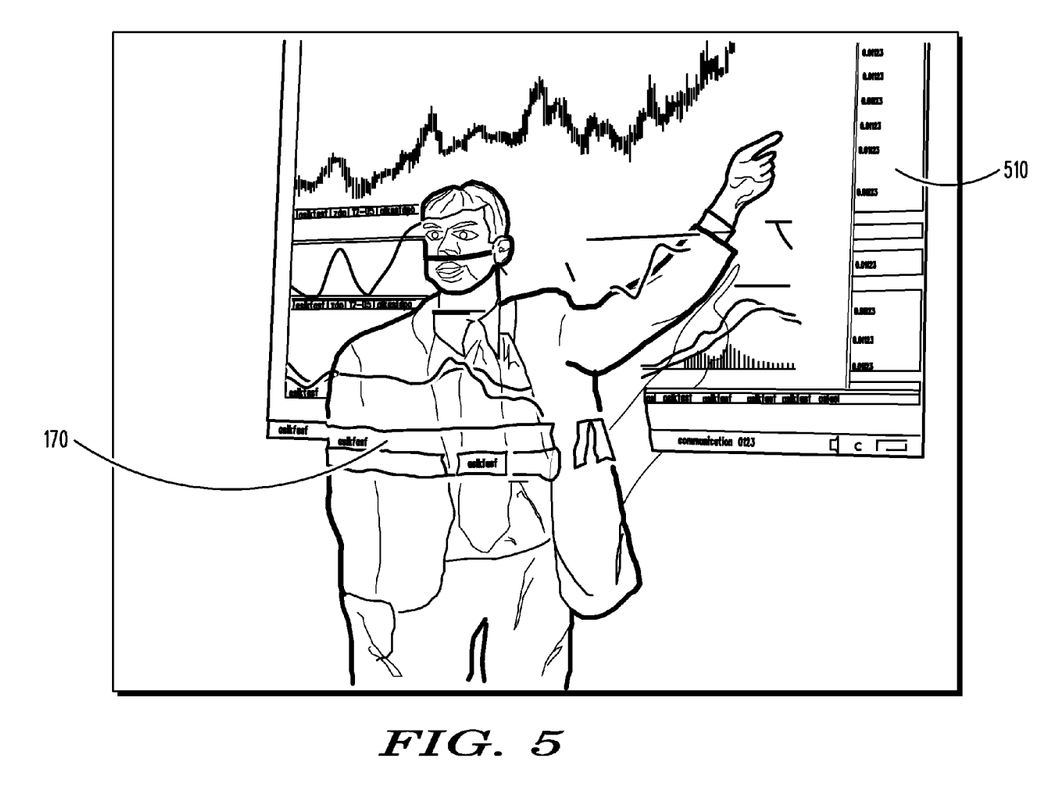
FIG. 5 shows a front projection image being displayed on a presenter and how such an image can affect the overall presentation.

FIG. 5 is an illustration of a presenter 170 occluding the presentation and being projected upon by the projection device. As shown, the projected light or projected image 510 is blocked by the presenter 170. Stated differently, the projected image falls upon the presenter when the presenter enters into the projected image. This is undesirable for both presenter and audience: the presenter may be blinded by the bright projected light, while the audience is denied a clear view of the presenter and is distracted by the image and text projected onto the presenter's face and body. For these reasons it is desirable to separate the presenter 170 from the image being projected upon him.

Figure 6:
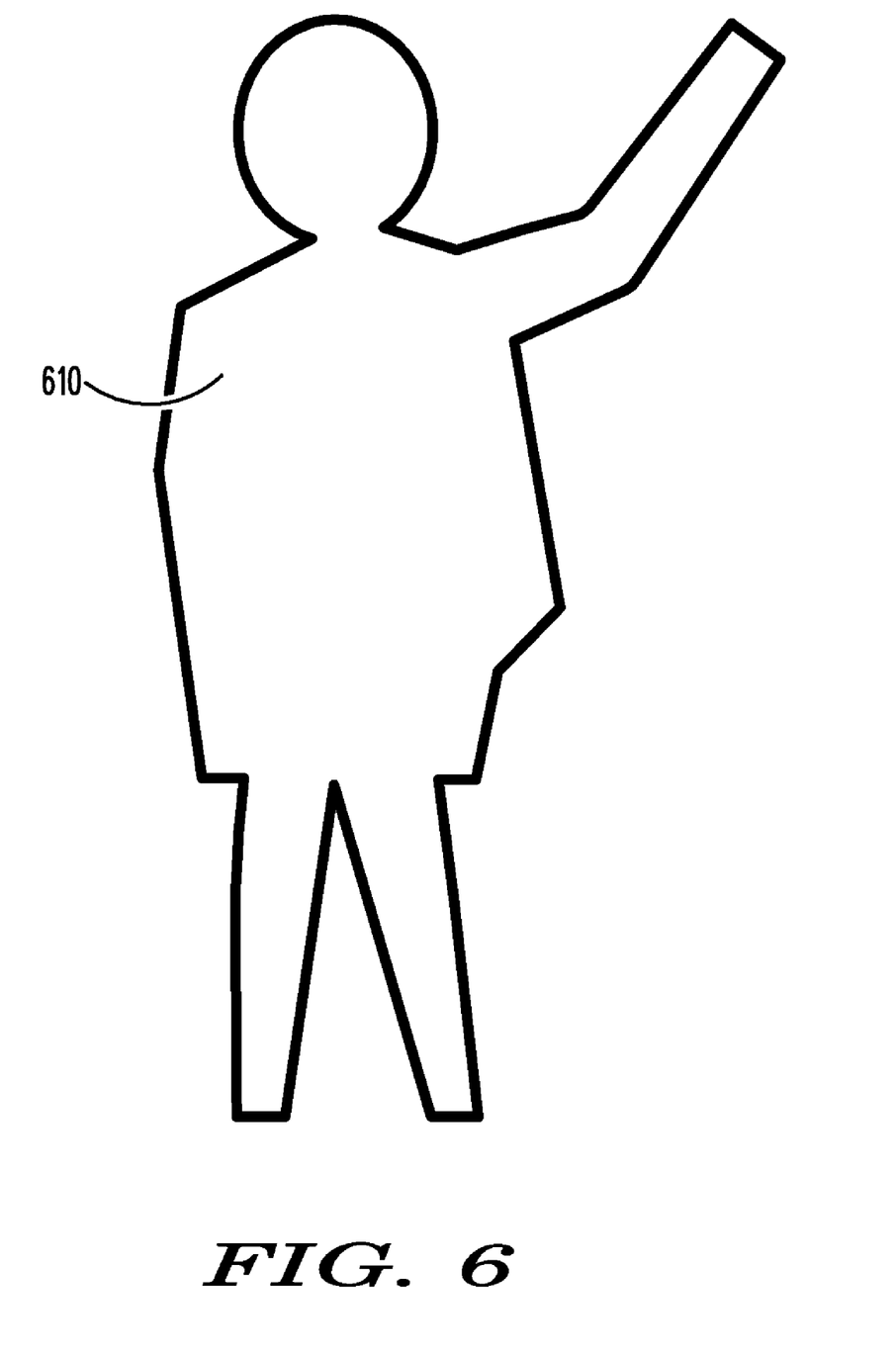
FIG. 6 illustrates a dynamic mask image created by isolating the presenter from the background in accordance with a possible embodiment of the invention.

FIG. 6. is an illustration of a dynamic mask corresponding to an isolated image of a presenter in accordance with a possible embodiment. The mask is derived from a depth imaging segmentation of foreground and background. Depth imaging provides a practical method of identifying those pixels of a projected image that are occupied by the presenter or other foreground object being projected onto by the projection device. If the viewpoint of the depth image is the same (or very close) to that of the projector, the isolated image can be computed by directly identifying the foreground pixels in the depth image. If the viewpoint of the depth image is not close enough to that of the projector, the foreground pixel positions from the depth image need to be mapped to the viewpoint of the projector. Given the known relative 3D position of the projector viewpoint with respect to the viewpoint of the depth image, and the depth information of the foreground pixels, this mapping can be done using a simple projective transformation, as is known to those of ordinary skill in the art. The identified pixels are converted to a silhouette or a dynamic mask 610 of the presenter or other foreground object. The mask 610 is dynamic in that its shape and size are modified in real time according to the presenter's movement and position. The dynamic mask 610 can then be combined with the projected image to inhibit or reduce or otherwise modify the projected image in that area occupied by the presenter. Put another way, the created dynamic mask is used so that at least one pixel of a projected image is modified according to its location with respect to the dynamic mask.

Figure 7:
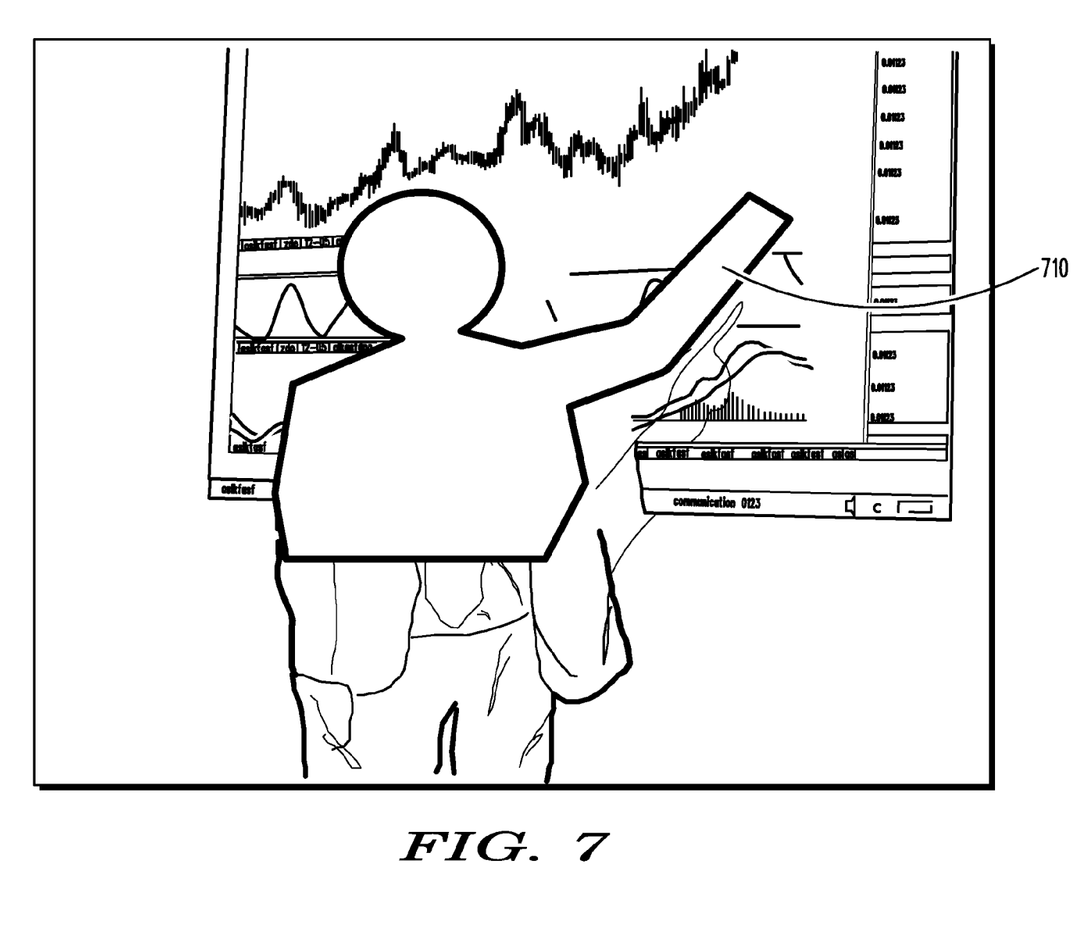
FIG. 7 illustrates a dynamic mask image merged into an image being displayed on a viewing surface in accordance with an embodiment of the invention.

FIG. 7 is a modification of a projected image with a dynamic mask in accordance to an embodiment of the invention. The dynamic mask 610 has been combined with the projected image to produce a composite image. This composite image when projected by projection device 180 will have the illumination modified 710 for the pixels corresponding to the presenter's position. The modification is a reduction in illumination, a substitution of colors or textures that blend better with the presenter, shining a non-image light on the presenter, or other effect designed to improve the presenter's or the audience's presentation experience.

Figure 8:
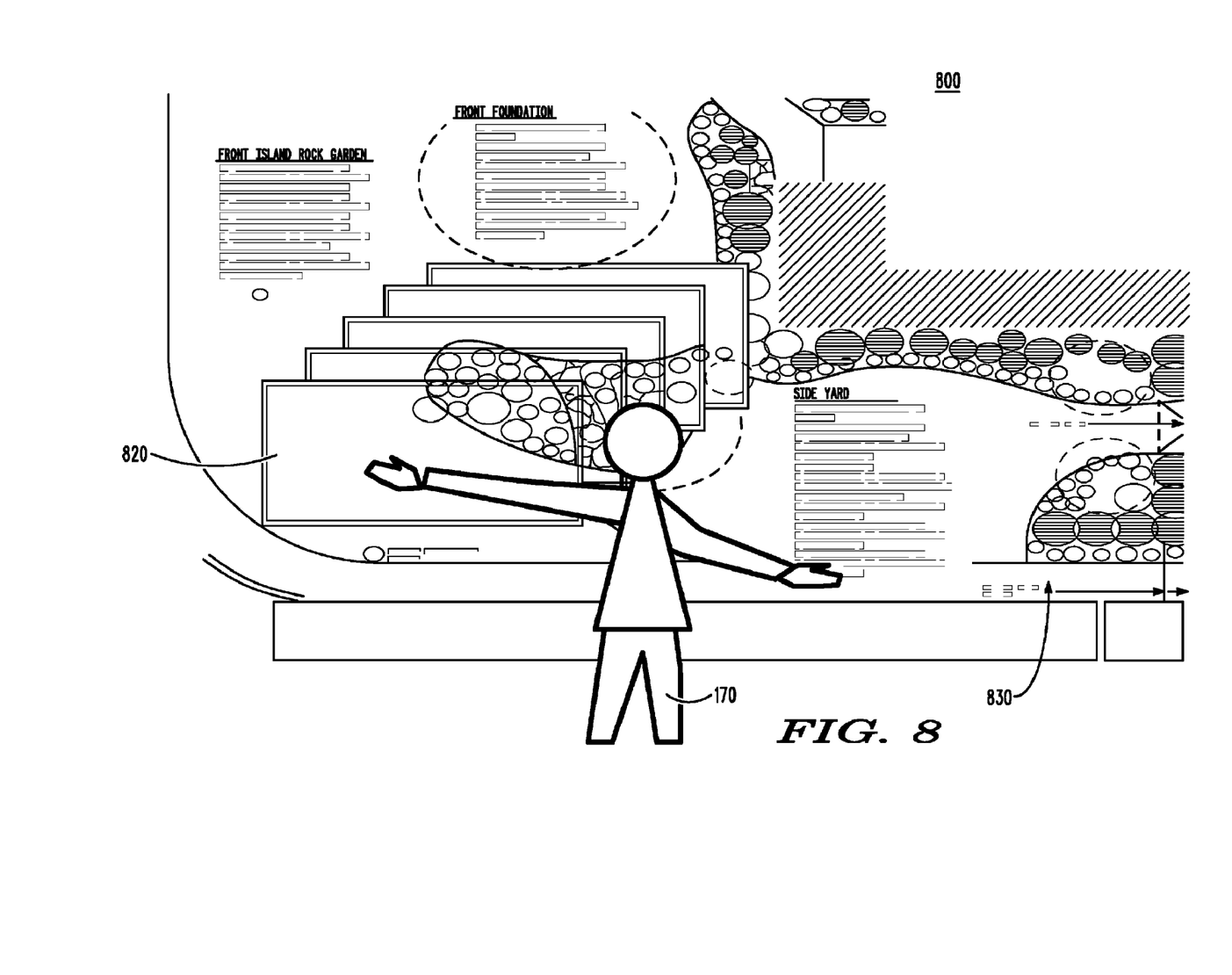
FIG. 8 is an illustration of the manipulation of a presentation through gestures in accordance with an embodiment.

FIG. 8 is a presenter invoking enhanced features of a projection system 800 in accordance with an embodiment of the invention. In addition to inhibiting the illumination on the presenter 170, it would be advantageous to have the presenter be able to manipulate the entire presentation from a natural position standing near a screen. Here the presenter has a presentation 830 that has enhanced features like a magnifying glass visual effect 820. Other enhanced features are possible such as highlighting text, highlighting objects, selecting a slide from a slide show, controlling the projection device, or other visual enhancements or presentation aids. As noted above, the gestures of the presenter 170 can be isolated and a command can be identified from the acquired depth image.

Figure 9:
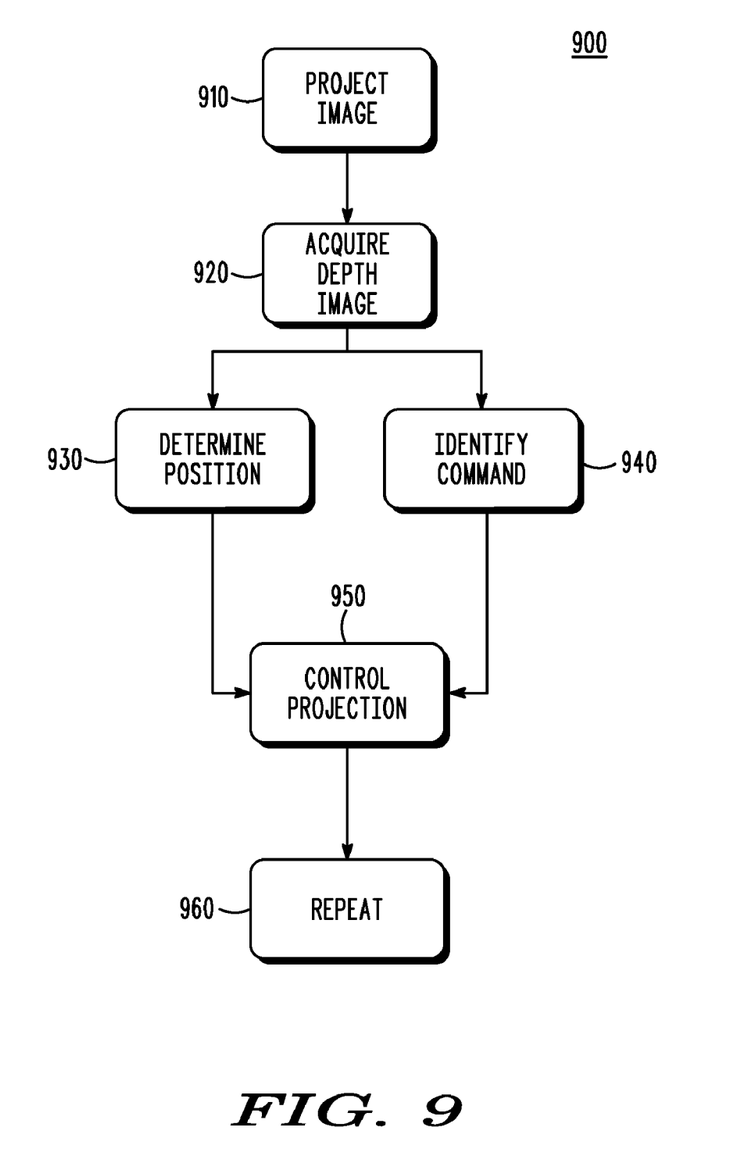
FIG. 9 is an exemplary flowchart illustrating one possible process in accordance with one possible embodiment of the invention.

FIG. 9 is an exemplary flowchart illustrating some of the basic steps associated with a projection process 900 in accordance with a possible embodiment of the invention. The process begins at step 910 by projecting at least one image onto a viewing surface and continues to step 920 where a depth image is acquired. The depth image can be acquired by employing a vision based input device such as a stereo camera or a system comprising two or more monocular cameras and stereoscopic depth processing. These cameras can be positioned at the projection device or at the viewing surface.

At step 930, through depth imaging analysis the position of the foreground object can be determined. Alternatively or in parallel the gesture of the presenter can be determined in step 940 to identify a command.

At step 950, the projection is controlled by modifying the projected at least one image based on the position of the foreground object. Alternatively or in addition, the projected at least one image is modified by performing the identified command (step 940) such as highlighting text, highlighting objects, invoking a magnifying glass visual effect, selecting a slide from a slide show, controlling the projection device, or other visual enhancements or presentation aids.

The process goes to step 960 and is repeated.

Figure 10:
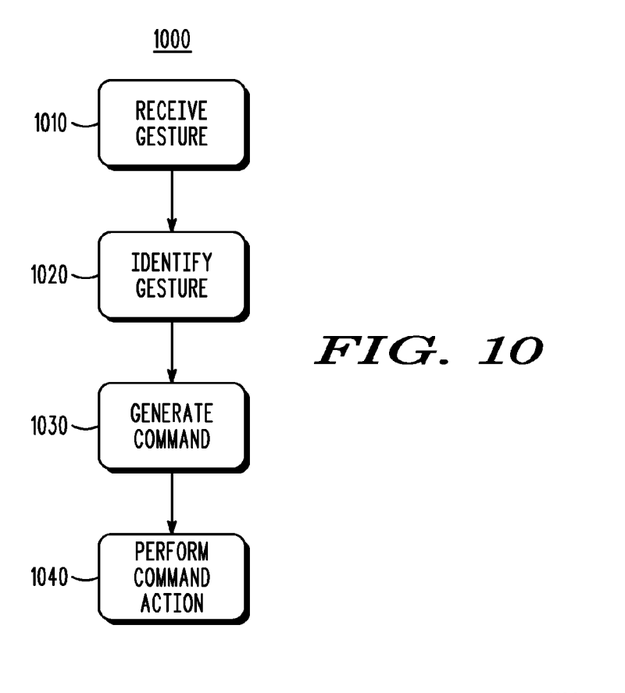
FIG. 10 is an exemplary flowchart illustrating one possible gesturing command identification process in accordance with one possible embodiment of the invention.

FIG. 10 is an exemplary flowchart illustrating some of the basic steps associated with a command gesturing process 1000 in accordance with a possible embodiment of the invention. The process begins at step 1010 with receiving a gesture from the presenter. The gesture is an isolation of the presenter's hand, arm, or other body part as described in FIG. 4. Once the gesture has been received, control passes to step 1020 for further processing. In step 1020, the gesture is identified by comparison to at least one stored gesture using pattern recognition means, or other gesture identification means. The gesture, such as one of various hand gestures of a user, is recognized by software running in processor 140. In step 1030, the identified gesture is processed to determine a command. Processor 140 generates a command to perform an action such as highlighting text, highlighting objects, invoking a magnifying glass visual effect, selecting a slide from a slide show, controlling the projection device, or other visual enhancements or presentation aids. In step 1040, the commanded action is performed by the projection system 100.

Figure 11:
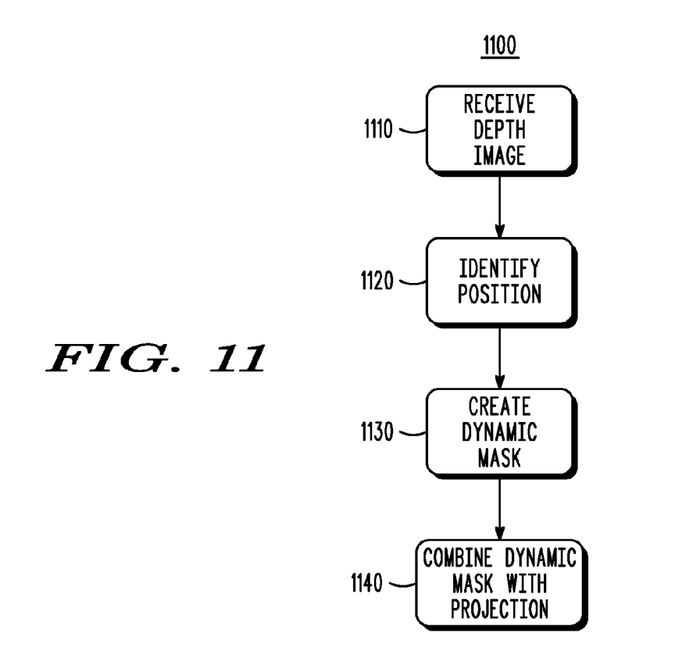
FIG. 11 is an exemplary flowchart illustrating one possible position identification process in accordance with one possible embodiment of the invention.

FIG. 11 is an exemplary flowchart illustrating some of the basic steps associated with an application of a dynamic mask projection process 1100 in accordance with a possible embodiment of the invention. In step 1110, a depth image is received. In step 1120, the depth image is processed to identify those pixels of a projected image that are occupied by the presenter or other foreground object being projected onto by the projection device. In step 1130, a dynamic mask is created from the pixels identified in step 1120. In step 1140, the dynamic mask is combined with the projected image. In a variation of step 1140, alternative image contents may be combined with the projected image within the dynamic mask region, outside the dynamic mask region, or both within and outside the dynamic mask region.

The projection system may perform such functions in response to processor 140 by executing sequences of instructions contained in a computer-readable medium, such as, for example, storage 150, a magnetic disk, or an optical disk. Such instructions may be read into storage 150 from another computer-readable medium or from a separate device via input/output device 160 communication interface.

The hardware illustrated in FIG. 1 and the related discussion are intended to provide a brief, general description of a suitable computing environment in which the invention may be implemented. Although not required, the invention will be described, at least in part, in the general context of computer-executable instructions, such as program modules being executed by a computer, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the projection system in FIGS. 1-2, each processing the content in various possible ways. It does not necessarily need to be one system used by all end users. Accordingly, only the appended claims and their legal equivalents should define the invention, rather than any specific examples given.

We claim:

1. A projection system, comprising:
    a projection device for projecting at least one image onto a viewing surface;
    an input device for acquiring a depth image of at least one foreground object relative to the input device, wherein the input device is at least one of a stereo camera and a system comprising two or more monocular cameras;
    processing logic configured to:
    determine from the acquired depth image the position of the foreground object;
    modify the projected at least one image based on the position of the foreground object; and
    create from the acquired depth image a dynamic mask of the foreground object.

2. The system of claim 1, the processing logic further configured to:
    identify from the foreground object at least one command instructing the projection system to perform an action.

3. The system of claim 2, wherein when identifying a command the processing logic is configured to create from the at least one of the acquired depth image and an image acquired from a camera an isolated image of a presenter's gesturing hand.

4. The system of claim 2, wherein a command to perform an action is at least one of highlighting text, highlighting objects, invoking a magnifying glass visual effect, selecting a slide from a slide show, controlling the projection device, and other visual enhancements or presentation aids.

5. The system of claim 3, wherein modifying the projected at least one image is using the created dynamic mask so that the projected image is restricted to the viewing surface.

6. The system of claim 3, wherein modifying the projected at least one image is using the created dynamic mask so that at least one pixel of a projected image is modified according to its location with respect to the dynamic mask.

7. The system of claim 3, wherein modifying the projected at least one image is limiting the projection on the foreground object by reducing the intensity or by shining a non-image light.

8. The system of claim 2, wherein the projection system comprise processor, and static storage device that stores static information and instructions for the processor.

9. The system of claim 1, wherein the input device is positioned at the projection device or at the viewing surface.

10. A method performed by a projection system, comprising:
    projecting at least one image onto a viewing surface;
    acquiring with an input device a depth image of at least one foreground object relative to the input device, wherein the input device is at least one of a stereo camera and a system comprising two or more monocular cameras;
    determining from the acquired depth image the position of the foreground object; and
    modifying the projected at least one image based on the position of the foreground object; and
    creating from the acquired depth image a dynamic mask of the foreground object.

11. The method of claim 10, the method further comprising:
    identifying from at least one of the acquired depth image and an image acquired from a camera at least one command instructing the projection system to perform an action.

12. The method of claim 11, wherein when identifying a command the projection system is configured to create from at least one of the acquired depth image and an image acquired from a camera an isolated image of a presenter's gesturing hand; and
    wherein a command to perform an action is at least one of highlighting text, highlighting objects, invoking a magnifying glass, selecting from a slide show, controlling the projection device, and other visual enhancements or presentation aids.

13. The method of claim 10, wherein the input device is positioned at the projection device or at the viewing surface.

14. The method of claim 10, wherein modifying the projected at least one image is using the created dynamic mask so that the projected image is restricted to the viewing surface.

15. The method of claim 10, wherein modifying the projected at least one image is using the created dynamic mask so that at least one pixel of the projected image is modified according to its location with respect to the dynamic mask.

16. The method of claim 10, wherein modifying the projected at least one image is limiting the projection on the foreground object by reducing the intensity or by shining a non-image light.

17. An interactive presentation system comprising:
    a processor;
    a storage device coupled to the processor, wherein the storage device stores static information and instructions for the processor; and
    software means operative on the processor for:
    projecting at least one image onto a viewing surface;
    acquiring with a vision based input device a depth image of at least one foreground object, wherein the vision based input device is at least one of a stereo camera and a system comprising two or more monocular cameras;
    identifying from at least one of the acquired depth image and an image acquired from the vision based input device at least one command instructing the interactive presentation system to perform an action;
    determining from the acquired depth image the position of the foreground object;
    creating from at least one of the acquired depth image and an image acquired from the vision based input device a dynamic mask of the foreground object; and
    modifying the projected at least one image based on the dynamic mask.

18. The interactive presentation system of claim 17, wherein the vision based input device is positioned on the projection device or on the viewing surface;
    wherein modifying the projected at least one image is using the created dynamic mask so that the projected image is restricted to the viewing surface; and
    wherein a command to perform an action is at least one of highlighting text, highlighting objects, invoking a magnifying glass, selecting from a slide show, controlling the projection device, and other visual enhancements or presentation aids.

* * * * *